United States Patent
Smith et al.

(10) Patent No.: US 8,160,456 B2
(45) Date of Patent: Apr. 17, 2012

(54) BIAS CONTROLLER FOR AN OPTICAL MODULATOR

(75) Inventors: Andrew James Smith, Colchester (GB); Christopher Ralph Pescod, Chelmsford (GB); Mohammed Nawaz, Chelmsford (GB)

(73) Assignee: Bay Systems plc, London (GB)

( * ) Notice: Subject to any disclaimer, the term of this patent is extended or adjusted under 35 U.S.C. 154(b) by 398 days.

(21) Appl. No.: 12/515,103

(22) PCT Filed: Oct. 26, 2007

(86) PCT No.: PCT/GB2007/004096
§ 371 (c)(1),
(2), (4) Date: May 15, 2009

(87) PCT Pub. No.: WO2008/059198
PCT Pub. Date: May 22, 2008

(65) Prior Publication Data
US 2010/0054757 A1    Mar. 4, 2010

(30) Foreign Application Priority Data

Nov. 16, 2006 (EP) .................................. 06255873
Nov. 16, 2006 (GB) .................................. 0622850.6

(51) Int. Cl.
*H04B 10/04* (2006.01)
(52) U.S. Cl. ........................................ 398/198; 398/195
(58) Field of Classification Search ................. 398/198, 398/195
See application file for complete search history.

(56) References Cited

U.S. PATENT DOCUMENTS

| 5,453,608 | A | 9/1995 | Conder et al. |
| 6,930,814 | B2 * | 8/2005 | Livermore et al. ............ 359/239 |
| 2002/0061034 | A1 | 5/2002 | Schneider et al. |
| 2003/0107791 | A1 * | 6/2003 | Seung et al. ................... 359/245 |

(Continued)

FOREIGN PATENT DOCUMENTS

EP    0 631 169    12/1994

(Continued)

OTHER PUBLICATIONS

U.K. Patent Office, Search Report, Mar. 13, 2007, from related UK Patent Application No. GB 0622850.6, filed on Nov. 16, 2006.

(Continued)

*Primary Examiner* — Kinam Park
(74) *Attorney, Agent, or Firm* — Kenyon & Kenyon LLP

(57) ABSTRACT

A bias controller for an optical modulator. The modulator includes a bias electrode that is operable when appropriately biased by an applied bias voltage to configure the modulator to operate at quadrature, and the bias controller includes: a generating arrangement for generating power signals indicative of the optical output power of the modulator; and a processor operably connected to the generating arrangement and said bias electrode and arranged to receive said power signals from said generating arrangement and to control the bias voltage applied to said bias electrode. The processor is configured to vary the bias voltage applied to said bias electrode and to determine from power signals received from said generating arrangement a peak optical output power for said modulator, and to determine in dependence upon said peak optical power a target optical power for quadrature with reference to a store of predetermined values for peak output power and respective corresponding values of target optical power for quadrature. Other embodiments relate to a multi-channel bias controller, and to a method for controlling voltage bias in a modulator.

14 Claims, 6 Drawing Sheets

U.S. PATENT DOCUMENTS

2004/0247326 A1* 12/2004 Iwata et al. .................. 398/198
2006/0083144 A1 4/2006 Piede et al.
2006/0210210 A1 9/2006 Webb et al.

FOREIGN PATENT DOCUMENTS

GB 2 417 333 2/2006
WO WO 02/063381 8/2002

OTHER PUBLICATIONS

European Patent Office, Search Report, Feb. 9, 2007, from related European Patent Application No. 06255873.9, filed on Nov. 16, 2006.
European Patent Office, International Search Report and Written Opinion, Feb. 1, 2008, from International Patent Application No. PCT/GB2007/004096, filed on Oct. 26, 2007.

* cited by examiner

BIAS CONTROLLER FOR AN OPTICAL MODULATOR

RELATED APPLICATION INFORMATION

This application is a United States National Phase Patent Application of International Patent Application No. PCT/GB2007/004096 which was filed on Oct. 26, 2007, and claims priority to British Patent Application No. 0622850.6, filed on Nov. 16, 2006, and claims priority to European Patent Application No. 06255873.9, filed on Nov. 16, 2006, the disclosures of each of which are incorporated herein by reference.

FIELD OF THE INVENTION

This invention relates to bias controllers. Exemplary embodiments of the present invention relate to bias controllers for optical modulators, for example for so-called Mach-Zehnder modulators. Such modulators have utility, inter alia, in the field of optical communications systems.

BACKGROUND INFORMATION

Exemplary embodiments of the present invention will be described hereafter with particular reference to a bias controller for a Mach-Zehnder modulator (often known simply as an MZ modulator), the controller and modulator being employed in a communications system to modulate an input optical carrier signal with a radio frequency (RF) communications signal. Whilst the teachings of the present invention have great utility in optical communications systems, that is to say communications systems where the nodes of the system are optically connected, it will be immediately appreciated by persons of ordinary skill in the art that the teachings of the invention may otherwise be applied. Accordingly, the following illustrative description should not be read as being limited solely to communications systems or indeed to MZ modulators.

With the above in mind, reference will now be made to FIG. 1 where an illustrative schematic representation is provided of a known MZ modulator 1 of the type that is oft employed in optical communications systems.

MZ modulators provide a mechanism whereby an input optical carrier signal may be modulated with a communications signal, for example with an RF communications signal. In this example the modulator is effectively an interferometer, created by forming an optical waveguide in a suitable substrate such as Lithium Niobate ($LiNbO_3$) or Gallium Arsenide (GaAs) or Indium Phosphide (InP). The waveguide 11 of the modulator depicted in FIG. 1 is split into two branches 11a, 11b before recombining at an optical coupler 13. An optical carrier signal in the form of a beam of light enters the modulator from the left of FIG. 1 and exits the modulator from the right of FIG. 1 having passed through both branches of the waveguide.

As shown in FIG. 1, one of the waveguide branches 11a includes an asymmetry 15 that functions to introduce a phase difference between light travelling down respective branches 11a, 11b of the waveguide 11. The phase difference is chosen to be approximately 90 degrees at the wavelength of operation, which is typically in the region of 1300 or 1550 nanometers—this induces quadrature bias where the optical output is nominally 50% of its' maximum.

Lithium Niobate (in common with other similar materials such as GaAs or InP) is a glass-like material with a crystal structure that exhibits an electro-optic effect whereby the refractive index of the crystal structure changes as a voltage is applied thereto. In particular, the direction of the electric field induced by the applied voltage causes an increase or decrease in refractive index—an increased refractive index acting to slow light travelling through the crystal, and a decreased refractive index acting to increase the speed of light travelling through the crystal. In MZ modulators, the Lithium Niobate material is usually arranged so as to have an X cut, Y propagate crystal orientation with respect to the input optical signal, and in this context an electric field applied in the X direction (positive or negative) causes a change in the refractive index of the material that affects the speed of the light passing along the Y axis.

As shown in FIG. 1, a modulating electrode 7 is provided between the branches 11a, 11b of the waveguide, and when this electrode is energized by an applied signal (for example by a radio frequency or digital communications signal), positive and negative electric fields are established between the modulating electrode 7 and, respectively, first 3 and second 5 ground planes. The modulating electrode is designed as a transmission line so that the modulating signal travels with the optical carrier signal through the modulator, thereby enabling high modulating frequencies to be achieved.

The positive and negative electric fields cause the refractive index of the two branches 11a, 11b of the waveguide 11 to change (the positive field causing an increase in refractive index for branch 11a, and the negative field causing a decrease in refractive index for branch 11b), and the resulting different propagation speeds of the optical carrier signal through each branch cause a change in phase in the signals output to the optical combiner 13, which phase change causes the output level of light from the optical combiner 13 to change. In effect, as the electric fields experienced by each branch varies with the communications signal applied to the modulating electrode, so the phase difference between light passing through the two branches changes and the output level of the optical signal output from the combiner 13 varies accordingly. The net effect of this is that the input optical carrier signal is modulated with the communications signal applied to the modulating electrode 7.

Referring now to FIG. 2 of the accompanying drawings, the overall transfer characteristic of the modulator is approximately sinusoidal, with the most linear modulation being achieved in and around the quadrature point (also known simply as "quadrature", both terms being used interchangeably herein), namely the point where there is a 90° phase relationship between light travelling through respective branches 11a, 11b of the waveguide. The transfer function is a repeating function, and as such there are many quadrature points at different bias voltages but all with the same power output. Indicated in FIG. 2 is a first quadrature point A where the output power is increasing with voltage bias, and hence this quadrature point is referred to as a positive slope quadrature bias point. Also indicated are two further quadrature points B and C where the output power is decreasing with voltage bias, and these quadrature points are each referred to as negative slope quadrature bias points.

Whilst the foregoing sounds eminently achievable, in practice this 90° phase shift is rarely if ever achieved, and to compensate for this it is usual to include a biasable component 9, and to apply a DC bias voltage to the biasable component 9, to return the modulator to or near one of the aforementioned quadrature points. In the arrangement depicted in FIG. 1, the biasable component includes a discrete bias electrode, but this is merely illustrative as a number of alternative arrangements are known to persons skilled in the art. For example, a bias voltage may be applied directly to the modulating electrode by a so-called bias-Tee. In such an arrangement, the DC bias is coupled to the electrode via an inductor, and the applied signal (for example an RF communications signal) is coupled to the electrode via a capacitor.

A problem with this arrangement that has to be addressed is that the bias point, i.e. the voltage that needs to be applied to the biasable component to return the modulator to or near the quadrature point, shifts over time. For example, so-called trapped charges in the waveguide and temperature variations can each cause the bias point to shift at a rate of anything from a few millivolts per hour to several volts per hour.

Once consequence of this is that it is generally not possible to provide a system where the bias voltage, once set, need not be changed, and as such it is usual to provide some sort of dynamic bias control to enable modulator linearity to be maintained over an extended period of time.

In the analogue domain dynamic bias control has previously been achieved by applying a pilot tone (for example a 10 kHz tone for a GHz communications signal of interest) to the modulating electrode, by monitoring the output of the modulator and by adjusting the bias voltage based on that output. For example, as the $2^{nd}$ harmonic of the pilot tone usually tends to zero at or around the quadrature point, one previously proposed approach monitors this second harmonic and adjusts the applied DC bias voltage to drive the second harmonic to zero. A similar approach has previously been proposed for the digital domain, but in this instance the signal applied is typically a square wave dither signal, and the output is monitored by a digital signal processor.

Whilst each of these approaches do enable a form of dynamic bias control to be provided, they each have attendant disadvantages. For example, the application of a pilot tone necessarily gives rise to modulation products (for example sidebands) that limit the achievable dynamic range of the system, and for high-fidelity optical links this reduction in dynamic range is simply unacceptable. In very high-speed links (for example, digital links with speeds of up to 100 GBit/s and analogue links with frequencies of up to 60 GHz), the application of a dither can adversely affect the achievable data rate and the length of link that is achievable. Another disadvantage particularly prevalent in instances where multiple channels are required, for example in a phased array antenna system, is that as each modulator is different the bias control hardware needs to be fully replicated for each and every modulator. This increases system bulk, complexity and cost.

It would be advantageous if a bias controller could be devised that at least mitigated, and preferably avoided, problems of this ilk.

SUMMARY OF THE INVENTION

To this end, an exemplary embodiment of the present invention provides a bias controller for an optical modulator, said modulator including a biasable component that is operable when appropriately biased by an applied bias voltage to configure the modulator to operate at quadrature, the bias controller including: a generating arrangement for generating power signals indicative of the optical output power of the modulator; and a processor operably connected to the generating arrangement and said biasable component and arranged to receive said power signals from said generating arrangement and to control the bias voltage applied to said biasable component; wherein the processor is configured to vary the bias voltage applied to said biasable component and to determine from power signals received from said generating arrangement a peak optical output power for said modulator, and to determine in dependence upon said peak optical power a target optical power for quadrature by reference to a data store for said modulator having stored therein a plurality of values for peak optical output power and respective predetermined values for target optical power for quadrature.

As is later explained in detail, this arrangement is advantageous in that by controlling the bias voltage in dependence upon the output power it is possible to configure a given modulator to operate at quadrature without generating unwanted modulation products. Moreover, by storing a predetermined set of possible peak optical output powers for the modulator and for each value of peak power a respective value for target optical power for quadrature, any problems that might arise in prior art arrangements due to noise or non-linearity in modulators or associated equipment are avoided in determining how to adjust the modulator to operate at quadrature.

The processor may also be configured to vary said bias voltage until said power signals are indicative of an optical output power that is substantially equal to said target optical power. This arrangement is advantageous in that it enables the processor to automatically configure the modulator to operate at quadrature.

The processor may also be configured to monitor said optical output power and adjust said bias voltage to bring the modulator back to quadrature if said optical output power should be determined to be different from said target optical power.

In an exemplary implementation, the processor is configured to vary said bias voltage from a start voltage and increment said start voltage until said power signals are indicative of an optical output power that is substantially equal to said target optical power.

The start voltage may include a bias voltage associated with said determined peak optical output power. In this arrangement the processor may be configured to vary said bias voltage by increasing said voltage from said start voltage to thereby configure said modulator to operate at negative slope quadrature. Alternatively, the processor may be configured to vary said bias voltage by decreasing said voltage from said start voltage to thereby configure said modulator to operate at positive slope quadrature.

In another arrangement, the processor may be configured to determine said target optical power to be substantially half of said peak optical output power.

The generating arrangement for generating power signals may include a photodiode. The generating arrangement may be operably connected to said processor via an amplifier. The generating arrangement may be operably connected to said processor via an analogue to digital converter. The processor may be operably connected to said bias electrode via a buffer amplifier. The processor may be operably connected to said biasable component via a digital to analogue converter.

Another exemplary embodiment of the present invention relates to a multi-channel bias controller for a plurality of optical modulators, each said modulator including a biasable component that is operable when appropriately biased by an applied bias voltage to configure the associated modulator to operate at quadrature, the multi-channel bias controller including: a generating arrangement for generating a plurality of power signals each of which is indicative of the optical output power of a respective one of said plurality of modulators; and a processor operably connected to the generating arrangement and said plurality of biasable components and arranged to receive respective power signals from said generating arrangement and to control the bias voltages applied to each of said biasable components; wherein the processor is configured to vary the bias voltage applied to each of said plurality of biasable components and to determine from respective power signals received from said generating arrangement a peak optical output power for each said modulator, and to determine for each said modulator and in dependence upon respective peak optical powers a target optical power for quadrature.

In this arrangement, the processor may be configured to vary the bias voltages applied to each of said biasable components until said power signals for the modulator associated with each said bias electrode are indicative of an optical output power that is substantially equal to the target optical power for that modulator.

The processor may also be configured to monitor the optical output power for each said modulator and adjust the associated bias voltage to bring the modulator back to quadrature if said optical output power should be determined to be different from the target optical power for that modulator.

The processor may be configured to vary said bias voltages from a start voltage and increment said start voltage until said power signals are indicative of an optical output power that is substantially equal to said target optical power. The start voltage may include a bias voltage associated with said determined peak optical output power.

In one implementation the processor may be configured to vary said bias voltages by increasing said bias voltage from said start voltage to thereby configure said modulator to operate at negative slope quadrature. In another implementation the processor may be configured to vary said bias voltages by decreasing said voltage from said start voltage to thereby configure said modulator to operate at positive slope quadrature. A combination of each of these operating modes is also envisaged (for example one or more modulators may be configured to operate at positive slope quadrature, and one or more of the remaining modulators may be configured to operate at negative slope quadrature).

The processor may be configured for each said modulator to determine the target optical power for that modulator to be substantially half of the associated peak optical output power.

Alternatively, the data store may store, for each said modulator, a plurality of peak optical output powers and associated predetermined target optical output powers, but wherein the target optical output powers include power levels other than for operation of the respective modulator at quadrature. Advantageously, the bias controller according to this exemplary embodiment of the present invention may be used to set the target optical output power level for the modulator to any required output power level, for example in the range of 10% to 90% of the detected peak output power level.

In a further exemplary embodiment of the present invention, a dynamic process for calibration of the modulator is provided whereby, for a detected peak output power level, if the data store does not already contain a corresponding value for quadrature power, then a process may be executed to determine the corresponding quadrature power level and to store it in the data store.

The generating arrangement for generating power signals may include a plurality of photodiodes or a photodiode array. The generating arrangement may be operably connected to said processor via respective amplifiers. The generating arrangement may be operably connected to said processor via a multi-input analogue to digital converter, said converter having an output operably connected to said processor. The processor may be operably connected to each of said biasable components via a respective buffer amplifier. The processor may be operably connected to each of said buffer amplifiers via a multi-output digital to analogue converter, said converter having an input operably connected to said processor.

In an exemplary arrangement the processor may be configured to address each of said modulators in turn.

In any of the aforementioned arrangements, the processor may include a field programmable gate array, a microprocessor or a digital signal processor.

Another exemplary embodiment of the present invention relates to a method of controlling voltage bias in an optical modulator, the method including: measuring the optical output power of said modulator to determine a peak optical power measurement, establishing in dependence upon said determined peak optical output power a target optical output power for quadrature, and adjusting the voltage bias of said modulator so that the modulator optical output power is substantially equal to said target optical power.

Yet another exemplary embodiment of the present invention relates to a bias controller for an optical modulator, the bias controller including a processor configured to measure a peak optical output power and to determine based on said measured peak optical output power a target optical output power for quadrature.

Another exemplary embodiment of the present invention relates to a modulating unit for an optical communications system, the unit including a laser for generating an optical carrier signal, a generating arrangement for generating a signal to be applied to said carrier signal, an optical modulator for modulating said carrier signal with said applied signal, and a bias controller as described herein for configuring said modulator to operate at quadrature. Yet another embodiment of the present invention relates to a modulating unit for a multi-channel optical communications system, the unit including for each said channel a laser for generating an optical carrier signal, a generating arrangement for generating a signal to be applied to said carrier signal, and an optical modulator for modulating said carrier signal with said applied signal, the unit further including a multi-channel bias controller as described herein for configuring one or more of said modulators to operate at quadrature Further embodiments and advantages of the present invention will be apparent from the following detailed description.

DETAILED DESCRIPTION

Exemplary embodiments of the present invention will now be described in more detail, by way of example only, with reference to the accompanying drawings.

Although this point has been made earlier, it is worth reiterating at this juncture that whilst various exemplary embodiments of the invention will now be described with particular reference to an MZ modulator in a communications system, the teachings of the present invention are not limited to the use of a bias controller with an MZ modulator, or indeed to the use of a bias controller in a communications system. Many other applications and modulators with which the bias controller may be used will be immediately apparent to persons of ordinary skill in the art, and as such the following description should be read as merely being illustrative of the teachings of the invention.

Figure 1:
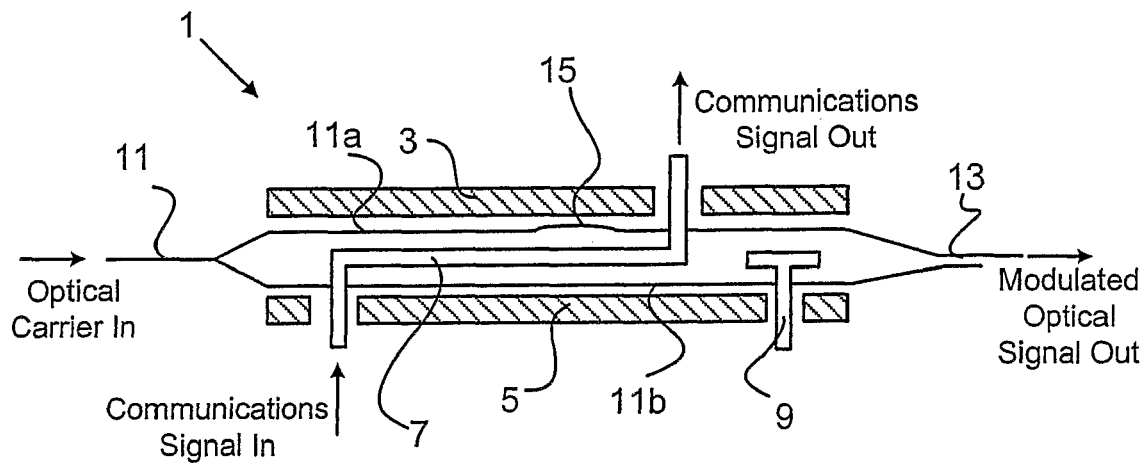
FIG. 1 is a schematic representation of a known Mach-Zehnder modulator.
Figure 2:
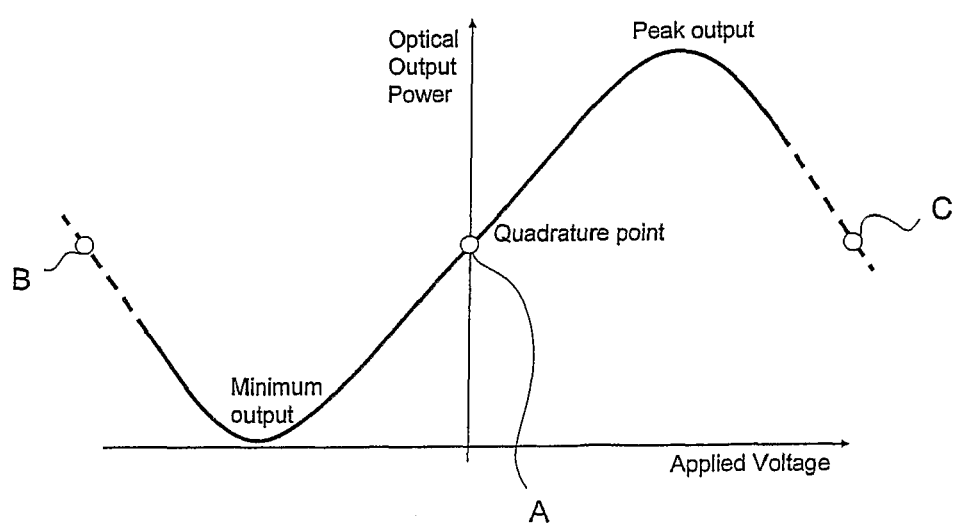
FIG. 2 is a schematic representation of an illustrative modulator transfer function.

With this proviso in mind, reference will now be made to FIG. 3 of the accompanying drawings in which there is depicted a schematic representation of a bias controller 17 according to a first embodiment of the present invention. The bias controller 17 is shown as being coupled to a modulator, for example an MZ modulator of the type depicted in FIG. 1, and the modulator is driven by a continuous wave laser that is operable to provide an optical carrier signal with which a communications signal (such as an RF communications signal) is to be modulated. In this particular example the modulator includes a separate bias electrode, but it will be remembered from the foregoing that other arrangements are possible.

The controller 17 includes a photodiode 19 that is coupled to the modulator output, in one embodiment, by an optical tap coupler that is operable to "sniff" the optical signal output of the modulator and pass approximately 1 to 5% of that output to the photodiode 19. The photodiode and coupler may be combined in a single unit (for example the unit may include a partially reflective mirror and may be arranged so that light enters the unit via a first fiber and most (e.g. 95%) is reflected into another fiber; a proportion of that light (e.g. 5%) being transmitted through the mirror to be incident upon the photodiode). As an alternative, the photodiode may be integrated into the modulator and be arranged to couple into the effanescent field above the waveguide.

The photodiode 19 output is coupled, optionally by way of an amplifier 23, to an analogue-to-digital converter 25 that is coupled to a voltage input of a processor 27. The processor 27 has a bias output that is coupled to a digital-to-analogue converter 31, and the D-A converter 31 is coupled to a buffer amplifier 33 that is connected to the bias electrode (not shown) of the modulator.

In this exemplary embodiment, the processor is associated with a look-up table 29 that includes a table of input voltage levels corresponding to measured output power peaks and corresponding target output power levels that will configure the modulator to be at or (at least close to) the quadrature point. As will later be described, the processor is configured to execute software, consisting of one or more algorithms, to find a maximum output power peak for a given modulator output and to select the corresponding target output power level and to vary the voltage applied at the bias electrode until the modulator reaches the quadrature point.

The principal advantage of this controller is that the bias voltage applied to the bias electrode of the modulator is controlled by monitoring only the output optical power of the modulator. As will be apparent to persons skilled in the art, if the input average optical power remains constant (which it will in almost all instances) then the average output optical power will also remain constant for any given bias point (the presence of an RF signal on the modulating electrode has no appreciable affect on the average optical output power). Thus, once the maximum optical output power is known, the output power for the quadrature point will readily be derivable as the output power at the quadrature point (i.e. the point where the phase difference between light travelling through respective branches of the waveguide is 90 degrees) will be nominally half the maximum output power (i.e. the power when the respective branches are in phase). By applying this principle, the modulator can be set to the quadrature point by finding the maximum output power point, and then adjusting the applied bias until the output power is nominally half that of the maximum output power.

For high fidelity applications, a look-up table is required because of non-linearities in the system as a whole, which non-linearities mean that the power output in the region of the quadrature point is only generally linear (and hence the power at the quadrature point will only be approximately half maximum power). As such, the look-up table enables more accurate adjustments to be made given the non-linearities of the particular modulator/tap/photodiode combination with which the controller is to be used.

Notwithstanding the foregoing it is conceivable, for applications where a lower fidelity response is acceptable, for the processor to merely halve the detected maximum power and then vary the voltage applied to the bias electrode until the measured output power is at least approximately equal to the calculated quadrature power (i.e. the halved maximum power or some other fraction of the peak output power). Such an arrangement, whilst not ideal, would nevertheless be advantageous as the generation of sidebands and unnecessary replication of equipment would be mitigated.

Figure 4:
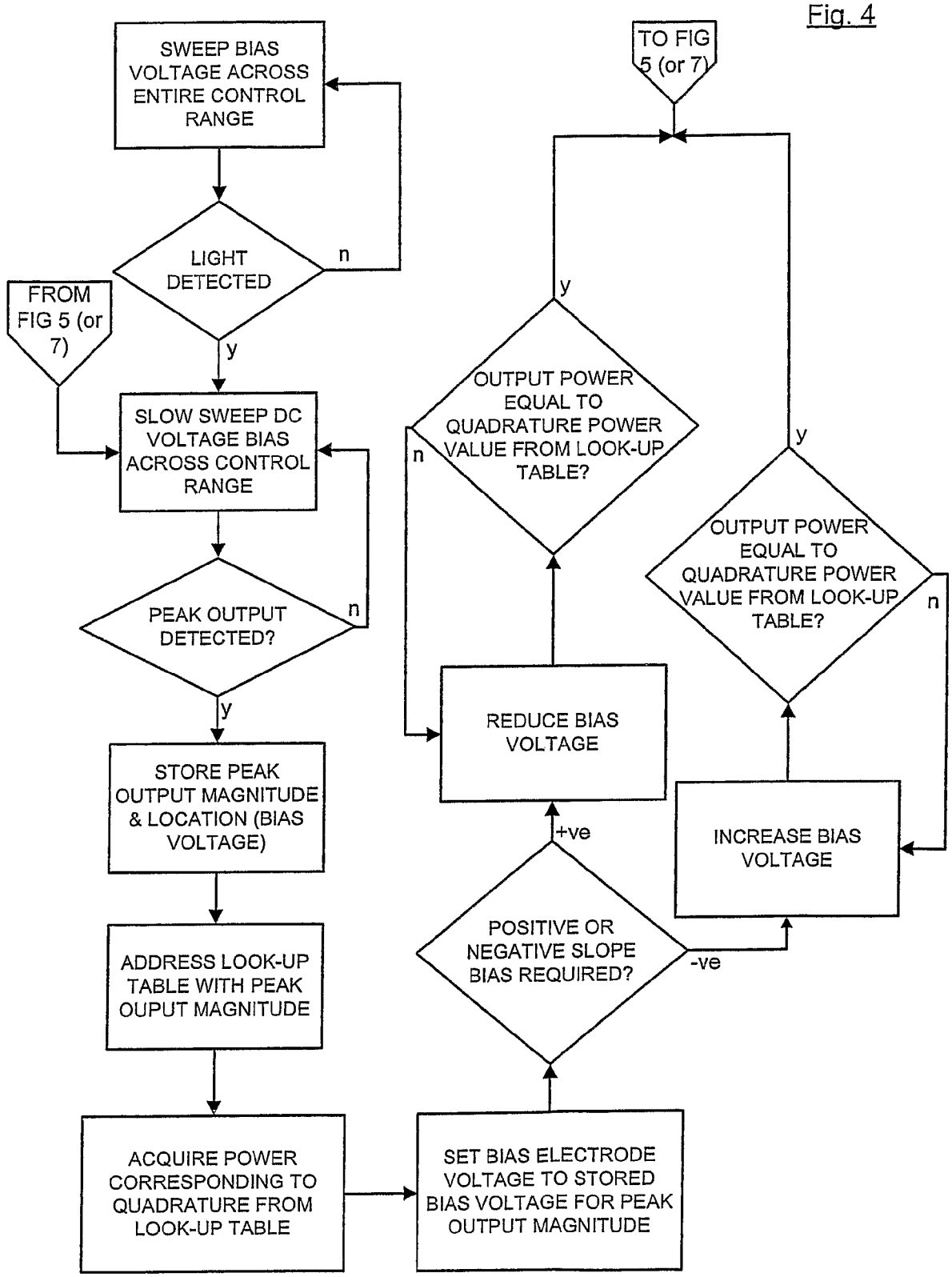
FIG. 4 is a flow chart depicting an illustrative modulator calibration process.

Referring now to FIG. 4, there is shown a schematic flow diagram showing the steps of the process whereby the modulator is calibrated. As shown, the processor initially sweeps the voltage bias applied to the bias electrode over the entire control range (which range will typically be less than +/−10V) until light is detected at the photodiode 19 and a voltage is input to the processor voltage input.

Once light has been detected, the processor then repeats the voltage sweep at a much slower rate and monitors the modulator output power by looking at the voltage input to the processor from the photodiode. The processor is configured, using any one of a number of well known algorithms, to look for a peak in the modulator power output and hence a peak in the voltage at the processor voltage input. Once a peak is detected, the magnitude of the peak and the location of the peak are stored. The magnitude of the peak corresponds to a voltage value received at the voltage input of the processor, and the location of the peak corresponds to the bias voltage applied to the bias electrode when the modulator output power is at that peak. In one implementation, the initial sweep of the full control range was accomplished in about one second. This sweep is to safeguard against a false determination that the laser is "off", when in fact the laser is on and the modulator is at minimum bias where the optical output is zero. The second sweep of the full control range, in this implementation, was accomplished in about 20 seconds. This slower sweep is used because some modulators lag behind their applied dc bias voltage, and hence if the sweep is conducted at too fast a rate the determined peak output values may be associated with incorrect bias voltages.

Once the peak magnitude and applied bias have been determined, the processor then addresses the look-up table (LUT) with the detected peak magnitude and retrieves from the LUT the corresponding target modulator power output level for the quadrature point. The processor then sets the bias electrode to the stored bias voltage for the detected peak, and depending on whether positive or negative slope bias is required the processor then reduces or increases the bias voltage from the level associated with the peak until the measured modulator output power is equal to the target modulator power output level retrieved from the LUT for the quadrature point.

Figure 5:
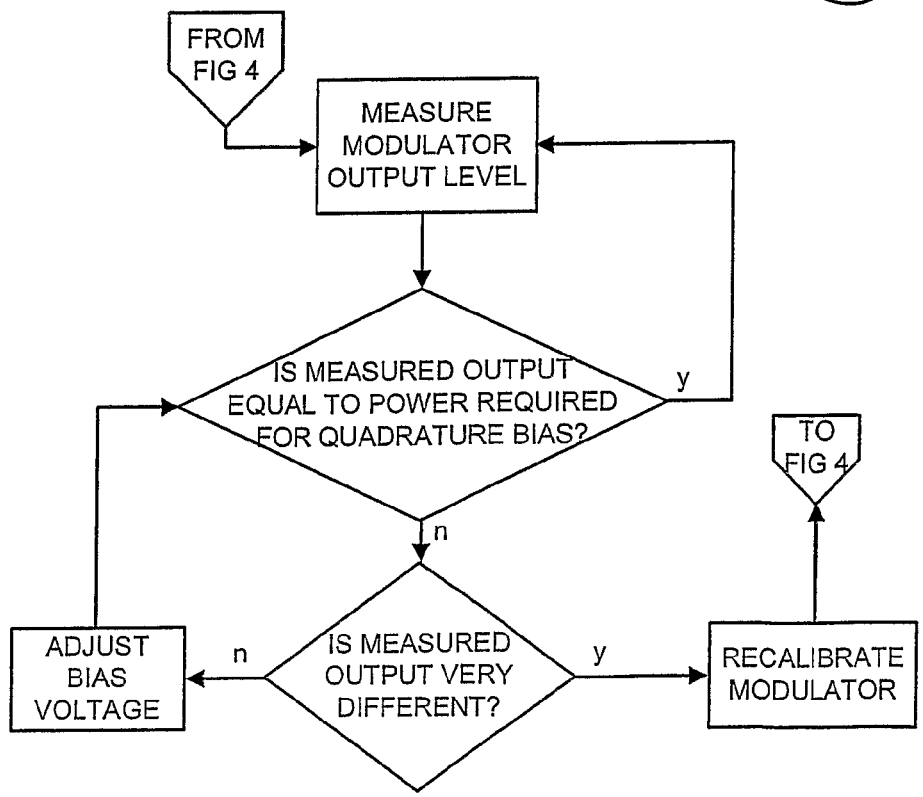
FIG. 5 is a flow chart depicting an illustrative modulator monitoring process.

Once the measured modulator power output (manifested as a digitized voltage at the processor voltage input) is equal to the target modulator power output level for the quadrature point (as retrieved from the LUT), the modulator is calibrated for operation at a selected quadrature point and processing moves to a monitoring phase depicted schematically in FIG. 5.

Referring now to FIG. 5, there is shown a schematic representation of a monitoring process for maintaining modulator calibration at the quadrature point.

The processor monitors the output level of the modulator (in the form of a voltage received at the processor voltage input) and compares that monitored level to the target power output for quadrature retrieved from the LUT during the calibration process.

If the output level of the modulator is found to be different to the target power required for quadrature bias, the processor then determines whether the measured output is very different from the target power. If it is determined that there is a large difference (for example greater than 5 to 10 percent of the peak value) between the measured output and the target power (as might happen if the power of the laser were to suddenly change), the processor determines that a recalibration of the modulator is required and processing reverts to the process depicted in FIG. 4. If the difference between the measured output and the target power is determined to be relatively small, then the processor is configured to adjust the voltage bias applied to the bias electrode to increase or reduce (as required) the bias voltage to return the modulator to the quadrature point.

In the event that adjustment should continue in one direction (i.e. by increasing or decreasing the bias voltage) to a limit point where the available control range has been exhausted (at which point the controller would not be able to further adjust the bias to give quadrature), the controller may either be configured to restart the process described above, or be configured to reverse the direction of bias change and roll the bias voltage away from the limit point until another quadrature bias point with the desired slope is reached.

As aforementioned, a particular advantage of the teachings of the present invention is that the controller is readily scaleable without having to duplicate all of the controller components. This is of particular importance when constructing multi-channel systems, and a schematic representation of an illustrative bias controller suitable for a multi-channel system is shown in FIG. 6.

Figure 6:
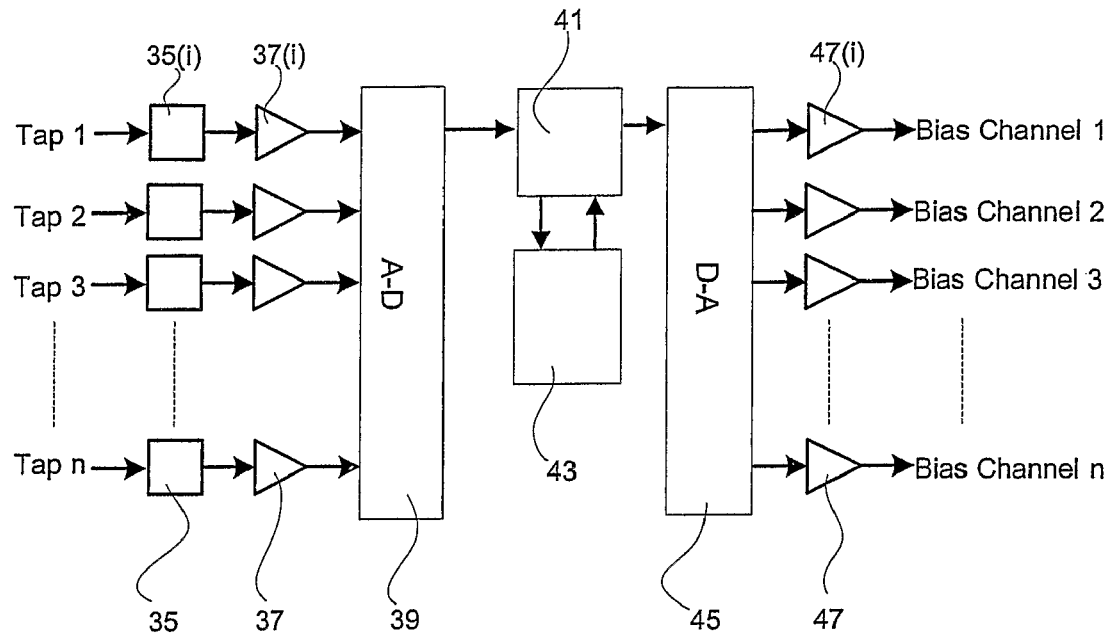
FIG. 6 is a schematic representation of a multi-channel modulator according to an exemplary embodiment of the present invention.

As shown in FIG. 6, the controller of this embodiment includes a plurality of input photodiodes 35 (or a photodiode array) that are each coupled to a respective modulator by way of a suitable device (such as the optical tap coupler of the preceding embodiment, or any of the alternatives thereto that are described above) that is operable to tap the output of the associated modulator and divert a proportion of the light emitted from the modulator. Each of the photodiodes 35 is coupled to a respective input of a multi-input analogue to digital converter 39 (essentially a multiplexer in combination with an A-D converter), optionally via respective amplifiers 37. The multi-input A-D converter 39 has an output that is coupled to a processor 41 which is associated with a memory module 43 that is configured to store a plurality of look-up tables, one table being provided for each connected modulator (to thereby enable the controller to compensate for non-linearities specific to a particular modulator/tap/photodiode combination). The processor 41 is coupled to an input of a multi-output digital to analogue converter 45 (essentially a demultiplexer in combination with a digital to analogue converter), and outputs of the multi-output D-A converter are coupled by way of buffer amplifiers 47 to the bias electrodes of respective modulators from which each of the aforementioned photodiodes receives a portion of the output light.

In other words, a first modulator (not shown) has an output that is tapped (tap 1) and passed to a first photodiode 35(i) that is coupled (optionally by way of a first amplifier 37(i)) to the processor 39. The processor 39 is coupled to the multi-output D-A converter 45, and a first output of the converter is coupled by way of a first buffer amplifier 47(i) via bias channel 1 to the bias electrode (not shown) of the first modulator (also not shown). Any number of modulators may be coupled to the processor in a similar fashion.

In one envisaged implementation, the processor may operate to implement the functionality described above in connection with FIGS. 4 and 5 of the drawings by servicing each of the connected modulators in sequence. As modulators tend to drift relatively slowly (at least compared to processing speeds) this approach is not detrimental to performance. Effectively, the processor is configured in the first instance to calibrate a first connected modulator, and once that modulator is calibrated the processor then calibrates a second connected modulator, and so on until all connected modulators have been properly calibrated. The processor then moves to a monitoring phase, as depicted in FIG. 5 where the output of each modulator is, in turn, monitored and adjusted as required to correct any drift from the quadrature point. In another envisaged implementation, phasing of modulators (to configure the modulators to operate at quadrature) may be accomplished as required—that is to say that the controller may be configured to inspect each modulator and adjust as required independently.

Figure 3:
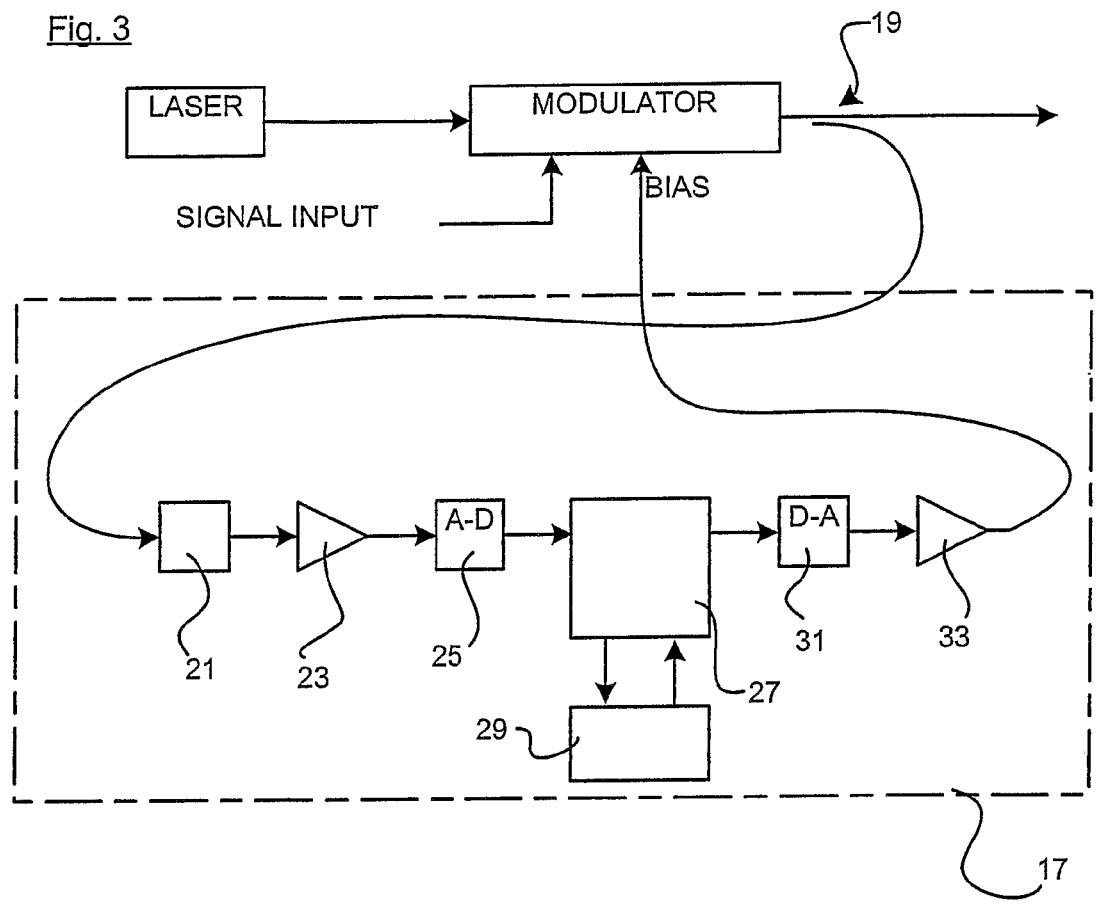
FIG. 3 is a schematic representation of a bias controller according to an exemplary embodiment of the present invention.

A particular advantage of this arrangement is that it is not necessary to replicate all of the components shown in FIG. 3 for each modulator. Rather only a single processor need be provided together with a single memory module for storage of data for all of the connected modulators. This arrangement reduces cost since it is only relatively low-cost components (such as photodiodes) that need to be replicated, as well as significantly reducing system bulk.

In this embodiment, the memory module includes a plurality of look-up tables (one for each connected modulator) that each contain modulator power output levels and corresponding target power output levels for quadrature. The processor in this embodiment is configured to address the memory module with a look-up table identifier that points the processor to the particular look-up table for the particular modulator that the processor is monitoring or calibrating, and with the measured peak modulator power output for that modulator so as to derive the associated target power level for quadrature.

Population of a look-up table for the embodiment of FIG. 3 may be accomplished as follows. In a first step, the controller depicted in FIG. 3 is assembled and coupled to a modulator. Next a fixed frequency RF source is used to excite the modulating electrode of the modulator, and a high frequency photodiode and RF spectrum analyser are used to monitor the output of the modulator. The modulator is then illuminated with a laser of known power, and the controller is allowed to determine the peak bias point. The peak power point is recorded and the bias is then adjusted manually to achieve quadrature bias by monitoring the RF harmonic content of the modulator output, and the optical power is then recorded. This process is repeated for a range of input laser powers, and interpolation is used to generate a fully populated table. For the multi-channel controller depicted in FIG. 6 this process is undertaken for each modulator coupled to the controller, and results for each modulator (as mentioned above) are stored in discrete addressable look-up tables. This process may be accomplished manually, or partially or be fully automated.

The embodiments depicted in FIGS. 3 and 6 may be implemented using any of a number of different components. For example, a field programmable gate array (FGPA), a digital signal processor (DSP) or a microcontroller may be employed as the aforementioned processor, and the look-up table(s) may be implemented in random access memory (RAM) or any other data storage device. The processor and look-up table(s) may be integrated into one component, or provided as separate components. In one practical implementation the arrangement depicted in FIG. 6 was used in a sixteen channel system (i.e. with sixteen discrete modulators), and in this arrangement twelve-bit D-A and A-D converters, an FPGA and an external flash RAM were employed. It will be immediately apparent, however, that the choice of these particular devices is purely arbitrary and that any of a variety of equivalent components may instead be employed.

It will be appreciated from the foregoing, that the teachings of the present invention offers advantages over previously proposed bias controllers. For example, as the embodiments described are fully digital, they can easily be scaled for multiple channels and much of the hardware can be reused. A further advantage is the arrangements described only interfere with the modulated output signal when adjustment of the bias voltage occurs, and as the embodiments described are digital this adjustment can be time-scheduled to fit in with the particular system with which the controller is to be used (for example, if the controller is to be used with an antenna system, the controller may be configured only to adjust the bias when the system is in a receive mode—that is to say a mode where the modulator is not needed).

A further advantage of the arrangements described is that they can readily be employed to adjust the optical output power to any arbitrary level, not necessarily to a quadrature power level, within the limits of ND resolution and system noise. For example, the output power may be adjusted to be any fraction of the peak output power (say between 10% and 90% of the peak power) to thereby improve link noise performance and/or linearity.

It will also be appreciated that many modifications and alterations may be made to the particular embodiments described above without departing from the spirit and scope of the present invention. In particular, exemplary variation on the calibration process described above with reference to FIG. 4 will now be described with reference to FIG. 8.

Figure 8A:
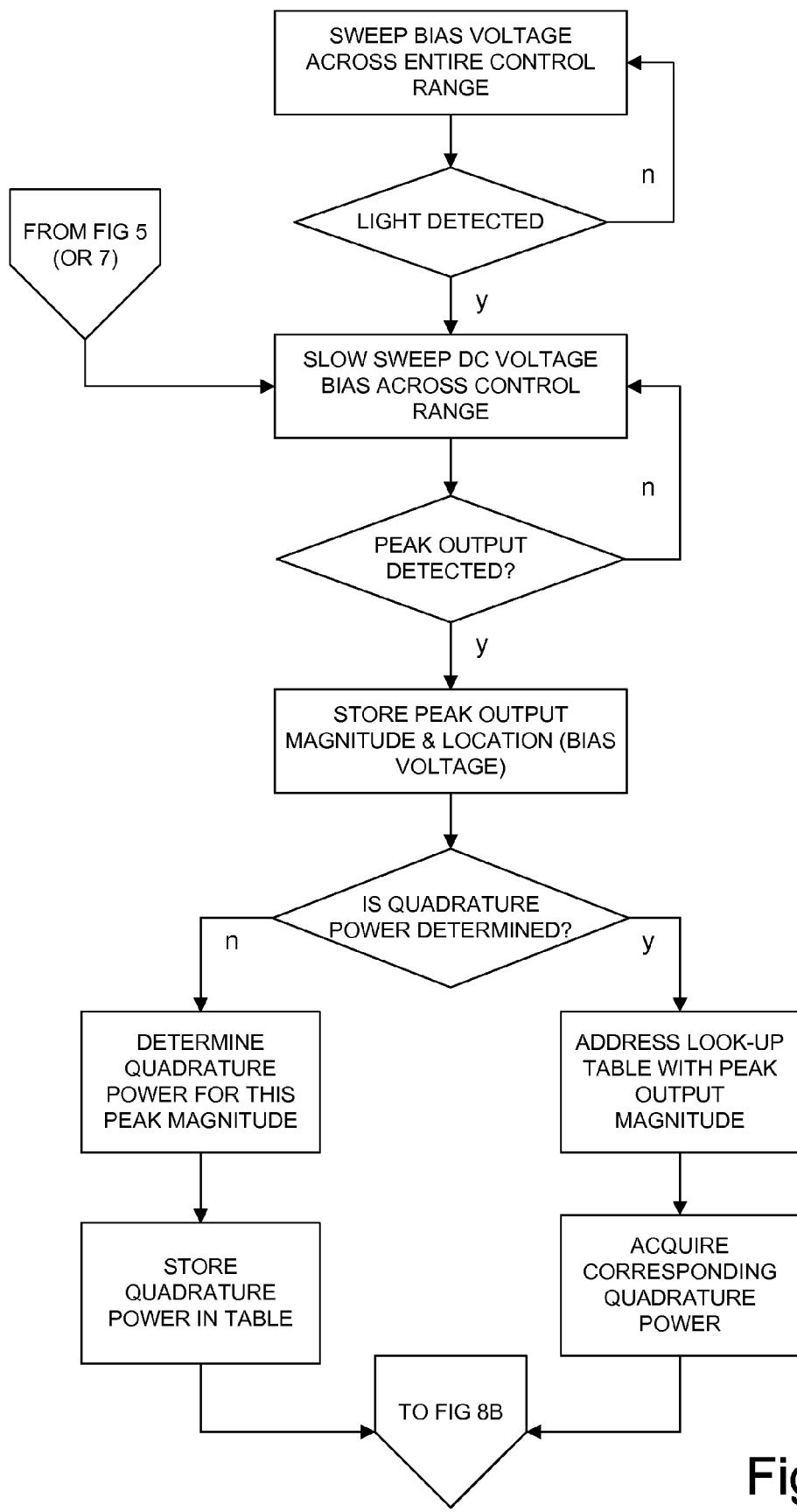
FIG. 8 is a flow chart depicting an illustrative variation on the modulator calibration process of FIG. 4.
Figure 8B:
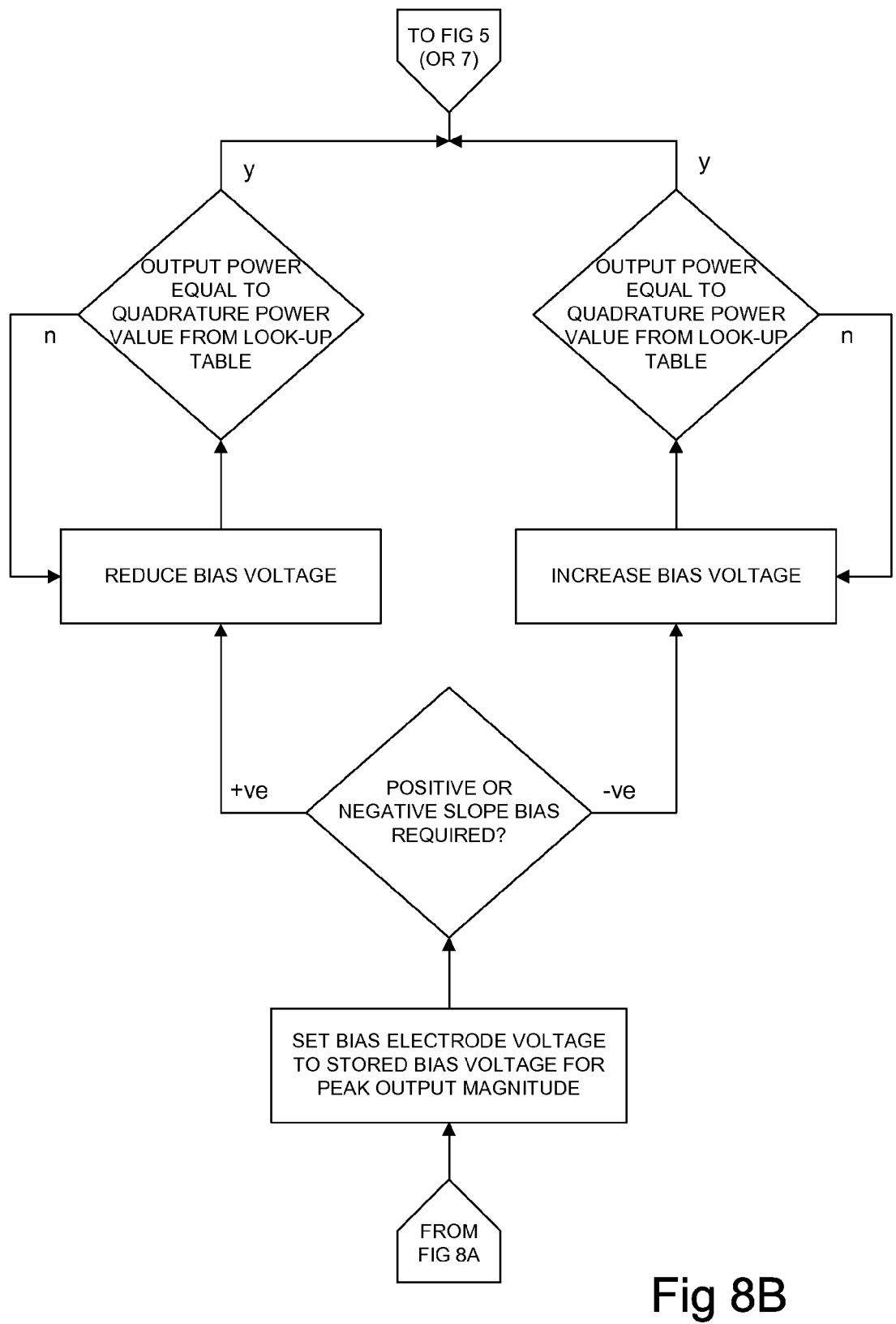

Referring to FIG. 8, those steps relating to the detection of a peak optical output power level remain the same as for the process in FIG. 4, as do those steps that follow the acquisition of a quadrature power from the look-up table that corresponds to the detected magnitude of peak output power. However, in the variation defined in FIG. 8, having detected the peak output power level for the modulator, a check is made as to whether or not a corresponding quadrature power has been determined and stored in the look-up table for that particular peak power. If there is a stored value for quadrature power corresponding to the detected peak power, then the process proceeds as for FIG. 4 above using the stored quadrature power value. However, if no corresponding quadrature power has been determined, then a process is executed to determine the quadrature power corresponding to the detected magnitude of peak power—one of a number of possible processes, one of which is described in outline above—and the determined quadrature power is stored in the table so that the process may then proceed as for FIG. 4.

The purpose of the variation defined in FIG. 8 is to allow for a dynamic population of the look-up table where the process for determining a quadrature power level corresponding to a detected peak power level may be automated and performed at an appropriate time during operation of the modulator.

Further variations to the exemplary embodiments described may include modifications to include further photodiodes that are configured (for example by way of appropriate taps) to sample optical power input to the associated modulator(s), and in this way the processor could be configured to automatically re-adjust in the event of a change in optical input power. This modification is advantageous because it would allow the controller to react more swiftly to input laser power changes, and because it would increase the probability of the controller responding correctly to input power changes. In particular, such an arrangement addresses uncertainties introduced as a consequence of relatively large-step laser power changes and relatively small-step bias point drift, thereby enabling changes to be made to laser power whilst the system is running.

Figure 7:
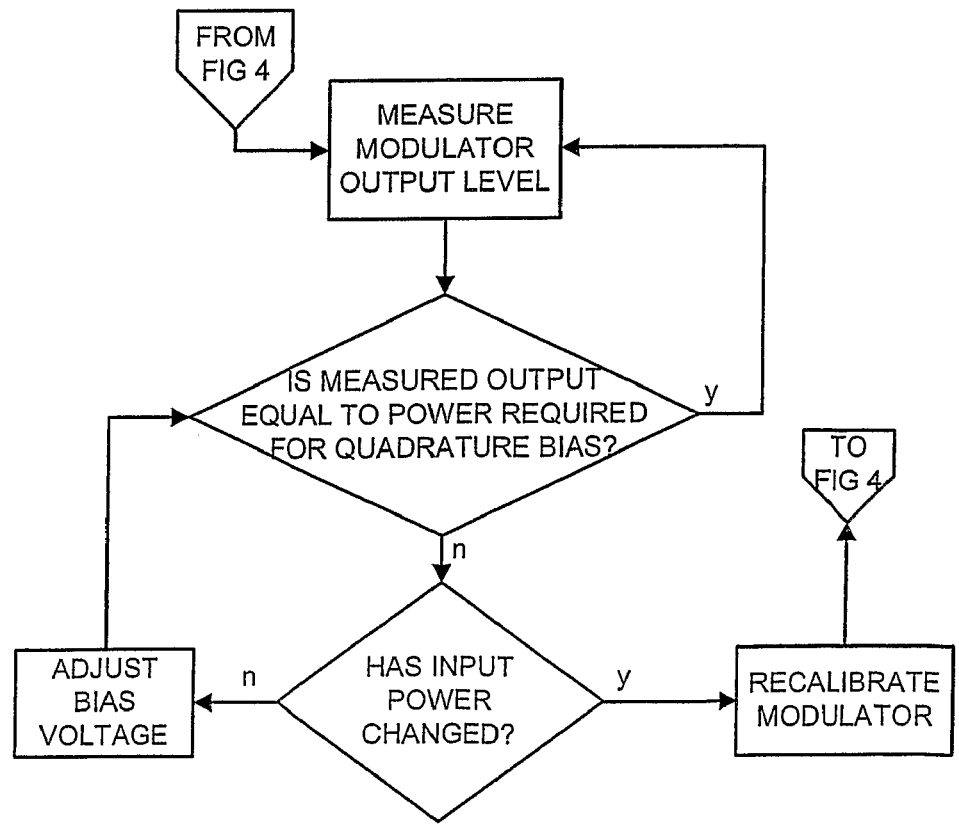
FIG. 7 is a flow chart depicting another illustrative modulator monitoring process.

One point of note in this regard is that with the system described herein it is important, for small changes in input laser power, for the controller to be configured to react as though a large change in input power has occurred and then adjust the modulator from that point. If this arrangement is not implemented, then a small change in input laser power could otherwise be interpreted as a bias drift, whereupon the controller could incorrectly adjust the bias voltage. To implement such an arrangement, a process as depicted in FIG. 7 may be employed. FIG. 7 is similar to the process depicted in FIG. 5 (in particular as regards the way in which the process interacts with that depicted in FIG. 4), except that the processor is configured in this arrangement to determine (see the lowermost diamond of FIG. 7) whether the input power has changed, following which the process continues as hereinbefore described. A change in input power may be determined, as outlined above, by a photodiode tap at the input to the modulator, or may be notified to the processor by the laser module itself or a supervisory control system.

In another modification, whilst the foregoing description refers in detail to a two-branch modulator, it will be appreciated by persons skilled in the art that an optical modulator with only a single branch (so called one-arm modulation) may be employed, but such an arrangement would require twice the voltage to be applied to the modulating electrode (and hence four times the applied power) than the equivalent two-arm modulator.

It is also the case that for some applications it may not be desirable for the monitoring process depicted schematically in FIG. 5 to automatically adjust the bias applied to the bias electrode of the modulator. For such applications it may be sufficient if the processor is configured merely to notify an operator of the bias controller if the modulator should drift away from the quadrature point. In this instance it would be possible for the processor to notify the operator of the severity of the drift away from the quadrature point, as well as the fact that a drift has occurred.

Lastly, it should also be noted that whilst the accompanying claims refer to particular combinations of features, the scope of the present invention is not limited to the particular combinations claimed at this time, but instead extends to any combination of features herein described irrespective of whether that combination is explicitly claimed hereafter.

The invention claimed is:

1. A bias controller for an optical modulator, comprising:
a biasable component that is operable, when appropriately biased by an applied bias voltage, to configure the modulator to operate at quadrature;
a generating arrangement for generating power signals indicative of the optical output power of the modulator during modulation;
a processor operably connected to the generating arrangement and the biasable component and arranged to receive the power signals from the generating arrangement and to control the bias voltage applied to the biasable component; and
a data store for said modulator having stored therein a plurality of values for peak optical power and respective predetermined values for target optical power for quadrature;
wherein the processor is configured to perform the following:
vary the bias voltage applied to the biasable component and to determine from power signals received from said generating arrangement a peak optical output power for the modulator,
determine in substantial dependence upon the peak optical power only, a target optical power for quadrature by reference to the data store,
monitor the optical output power during modulation by the modulator, and
adjust the bias voltage to bring the modulator back to quadrature if the optical output power should be determined to be different from the target optical power.

2. The bias controller according to claim 1, wherein the processor is configured to vary the bias voltage until the power signals are indicative of an optical output power that is substantially equal to the target optical power.

3. The bias controller according to claim 1, wherein the processor is configured to vary the bias voltage from a start voltage and increment the start voltage until the power signals are indicative of an optical output power that is substantially equal to the target optical power.

4. The bias controller according to claim 3, wherein the start voltage includes a bias voltage associated with the determined peak optical output power.

5. The bias controller according to claim 3, wherein the processor is configured to vary the bias voltage by increasing the voltage so as to configure the modulator to operate at negative slope quadrature.

6. The bias controller according to claim 3, wherein the processor is configured to vary the bias voltage by decreasing the voltage so as to configure the modulator to operate at positive slope quadrature.

7. The bias controller according to claim 1, wherein the processor is configured to determine the target optical power to be substantially half of the peak optical output power.

8. The bias controller according to claim 1, wherein the data store has stored therein a plurality of peak optical output powers and associated predetermined target optical output powers at power levels other than for operation of the modulator at quadrature.

9. The bias controller according to claim 1, wherein the processor is configured to determine the target optical power using a dynamic calibration process, which includes,
on detecting a peak optical output power for which there is no stored corresponding target optical power for quadrature, executing a process for interpolating a corresponding quadrature power and for storing the interpolated quadrature power in the data store.

10. A modulating unit for an optical communications system, comprising:
a laser for generating an optical carrier signal;
a generating arrangement for generating a signal to be applied to the carrier signal;
an optical modulator for modulating the carrier signal with the applied signal; and
a bias controller for an optical modulator including:
a biasable component that is operable, when appropriately biased by an applied bias voltage, to configure the modulator to operate at quadrature;
a generating arrangement for generating power signals indicative of the optical output power of the modulator during modulation;
a processor operably connected to the generating arrangement and the biasable component and arranged to receive the power signals from the generating arrangement and to control the bias voltage applied to the biasable component; and
a data store for the modulator having stored therein a plurality of values for peak optical power and respective predetermined values for target optical power for quadrature;
wherein the processor is configured to:
vary the bias voltage applied to the biasable component and to determine from power signals received from the generating arrangement a peak optical output power for the modulator;
determine in substantial dependence upon the peak optical power only, a target optical power for quadrature by reference to the data store;
monitor the optical output power during modulation by the modulator; and
adjust the bias voltage to bring the modulator back to quadrature if the optical output power should be determined to be different from the target optical power.

11. A method of controlling voltage bias in an optical modulator, the method comprising:
measuring an optical output power of the modulator to determine a peak optical power measurement;
establishing in substantial dependence upon the determined peak optical output power only, a target optical output power for quadrature;
monitoring the optical output power of the modulator during modulation by the modulator; and
adjusting the voltage bias of the modulator so that the modulator optical output power is substantially equal to the target optical power.

12. The modulating unit according to claim 10, wherein:
the modulating unit is configured for use with an antenna system; and
the controller is configured only to adjust the bias voltage when the antenna system is in a receive mode.

13. A multi-channel bias controller for a plurality of optical modulators, each the modulator including a biasable component that is operable when appropriately biased by an applied bias voltage to configure the associated modulator to operate at quadrature, the multi-channel bias controller comprising:
a generating arrangement for generating a plurality of power signals each of which is indicative of the optical output power of a respective one of the plurality of modulators during modulation; and
a processor operably connected to the generating arrangement and the plurality of biasable components and arranged to receive respective power signals from the generating arrangement and to control the bias voltages applied to each of the biasable components;

wherein the processor is configured to vary the bias voltage applied to each of the plurality of biasable components and to determine from respective power signals received from the generating arrangement a peak optical output power for each the modulator, and determine for each the modulator and in substantial dependence upon respective peak optical powers only, a target optical power for quadrature.

14. The bias controller according to claim 1, wherein the processor is configured to determine whether the input power has changed, during modulation by the modulator, and to repeat the operations of varying the bias voltage and determining the target optical power following a change in input power.

* * * * *